United States Patent [19]

Steele

[11] 4,124,298

[45] Nov. 7, 1978

[54] OPTICAL SMOKE DETECTOR INLET SCREEN

[75] Inventor: Donald F. Steele, Cohasset, Mass.

[73] Assignee: Electro Signal Lab, Inc., Rockland, Mass.

[21] Appl. No.: 777,043

[22] Filed: Mar. 14, 1977

[51] Int. Cl.[2] .................... G01N 21/00; G01B 17/10; G01N 21/26

[52] U.S. Cl. .................................. 356/338; 250/574; 340/630; 356/439

[58] Field of Search ...................... 356/103, 104, 207; 250/574, 575; 340/237 S

[56] References Cited

U.S. PATENT DOCUMENTS

| | | | |
|---|---|---|---|
| 3,863,076 | 1/1975 | Steele et al. | 356/207 |
| 3,968,379 | 7/1976 | Crane | 356/207 |

*Primary Examiner*—Vincent P. McGraw
*Attorney, Agent, or Firm*—Grover and Meegan

[57] ABSTRACT

An optical smoke detector has a housing which forms a dark chamber into which light is directed on a path viewed by a photocell. Light scattered from the path by smoke causes the cell to trigger an alarm. The housing includes an interior wall around the dark chamber and an exterior wall exposed to ambient light. A wire mesh extending between offset ports in the exterior and interior walls screens insects from the chamber and obstructs light from passing directly to the interior part.

5 Claims, 4 Drawing Figures

OPTICAL SMOKE DETECTOR INLET SCREEN

BACKGROUND OF THE INVENTION

Optical smoke detectors direct a beam of light into a dark chamber shielded so far as practicable from ambient light. Ports admit smoke into the dark chamber but must exclude insects because either smoke or insects scatter light in the dark chamber to a photocell shielded from the light source but viewing its light path.

It is the object of the present invention to provide means for screening insects from the dark chamber and also excluding light.

STATEMENT OF INVENTION

According to the invention an optical smoke detector comprises a housing forming a dark chamber, a source of light directed on a path in the chamber, a photocell viewing the light path and responsive to light scattered from smoke in the path to trigger an electric alarm signal, wherein the housing includes an exterior wall exposed to ambient light and an interior wall adjacent the dark chamber, the exterior and interior walls each having smoke ports peripherally offset with respect to the dark chamber, and wire mesh means extending between the exterior and interior walls screening passage of insects into the dark chamber, the wire mesh means being inclined with respect to the exterior port such that its wires obstruct exterior light rays from passing directly to the interior port.

DRAWINGS

DESCRIPTION

Figure 1:
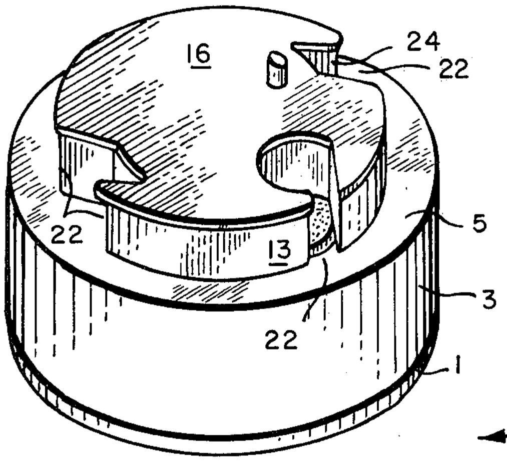
FIG. 1 is an isometric view of an optical smoke detector according to the invention.

The optical smoke detector of the figures comprises a circular base plate 1 with a flange 2 over a circular housing 3. The base and housing may also be of rectangular or other geometric shape. The housing shown comprises a lower wall 4 with a face 5 around an optical block 6 containing a light emitting diode source (LED) 7, a smoke sensing cell 8 and a compensating cell 9. As fully described in U.S. Pat. No. 3,863,076 light from the source 7 is directed on a path indicated by the axis 11 into a dark chamber 12 surrounded by the lower wall 4 and base 1, exterior walls 13 exposed to ambient light, interior walls 14 around the dark chamber 12, and a cover 16 over the interior and exterior walls which arise from the face 5 of the lower wall 4. From within the optical block 6 a smoke sensing photocell 17 views the dark chamber 12 along an axis 18 intersecting the light source axis 11 at a smoke detection zone Z. Light from the source 7 also is spread by a diffuser 19 over a second photocell 21 which compensates for variations in the smoke cell 17 as is well known in the smoke detector art. Also as is well known in the art it is necessary to exclude insects from the dark chamber 12 while admitting airborne smoke as freely as possible, and at the same time obstructing ambient light from the dark chamber where such light or insects will cause the smoke cell to trigger a false alarm.

Figure 4:
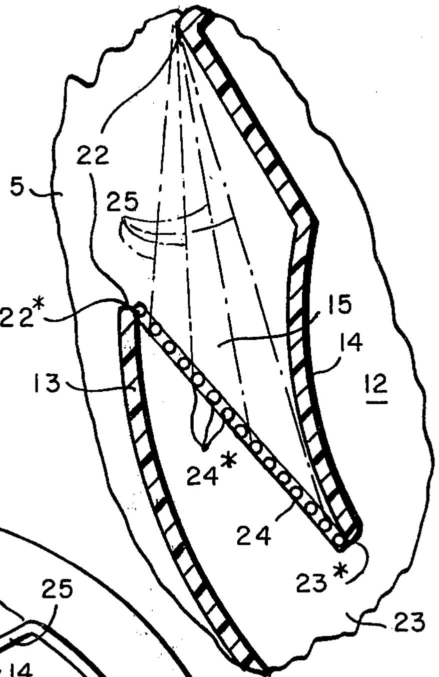
FIG. 4 is an enlarged detail of the screening means.
Figure 2:
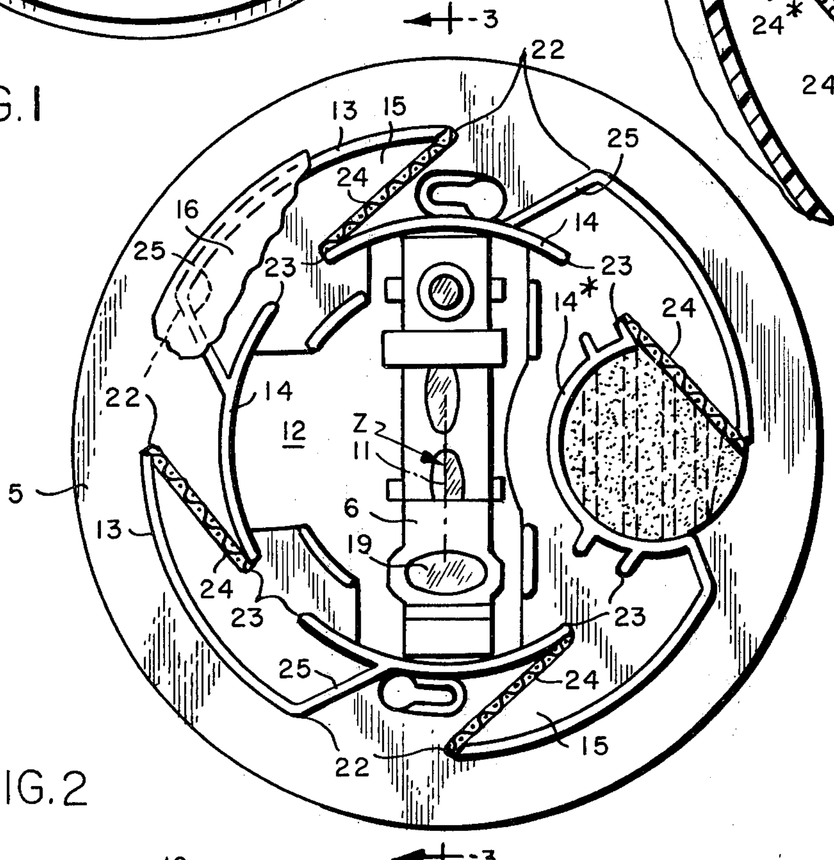
FIG. 2 is a plan view of the detector partly broken away to show screening means.
Figure 3:
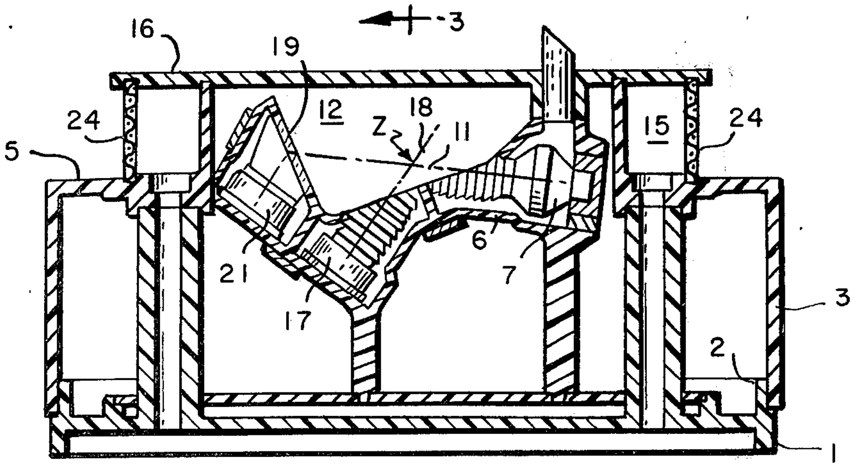
FIG. 3 is a section on line 3—3 of FIG. 2.

According to the present invention the dual exclusion of insects and ambient light is effected by providing the exterior walls 13 and interior walls 14 spaced radially of the dark chamber, it being understood that the exterior and interior walls may be rectangular. Further, smoke inlet and outlet ports 22 are provided in the exterior wall 13. These exterior ports 22 are peripherally offset from interior smoke ports 23 in the interior walls 14. As shown in FIG. 2 there are four sets of exterior and interior ports disposed substantially symmetrically around the periphery of the dark chamber housing. The interior and exterior walls 13 and 14 form a passage 15 between them terminating in an end wall 25 which forms a light trap with the other walls beyond the interior port. A wire mesh screen 24 is mounted between the closest edges 22* and 23* of the offset ports 22 and 23 as shown in detail in FIG. 4. Such a mesh typically comprises longitudinal members and transverse members 24* closely spaced. A typical mesh screen is of dull black coated aluminum wire cloth with wire 0.011 inch in diameter and 18 by 16 openings per square inch. Such a mesh or louvre array in a detector housing on the scale of five inches will provide a larger area than the ports for smoke to flow through almost as freely as if there were no mesh, because the openings through the mesh approximate the area of cross section of the passage between exterior and interior walls. And yet the mesh excludes direct rays of light from the interior port 23. Because of the offsetting of the exterior and interior ports and the inclination of the wire mesh screen with respect to the interior port the wires of the mesh obstruct light rays 25 from passing directly through the mesh. Some light scattering beyond the mesh is optically unavoidable, but the majority of direct rays are excluded by the inclined mesh.

It should be understood that the present disclosure is for the purpose of illustration only and that this invention includes all modifications and equivalents which fall within the scope of the appended claims.

I claim:

1. An optical smoke detector comprising:
   - a housing forming a dark chamber,
   - a source of light directed on a path in the chamber,
   - a photocell viewing the light path and responsive to light scattered from smoke in the path to trigger an electric alarm signal,
   - wherein the housing includes an exterior wall exposed to ambient light and an interior wall adjacent the dark chamber, the exterior and interior walls each having smoke ports peripherally offset with respect to the dark chamber, and
   - wire mesh means extending between the exterior and interior walls screening passage of insects into the dark chamber, the wire mesh means being inclined with respect to the exterior port such that its wires obstruct exterior light rays from passing directly to the interior port.

2. A detector according to claim 1 wherein the housing is circular and the ports are spaced substantially symmetrically around the entire periphery of the housing.

3. A detector according to claim 1 wherein the exterior and interior walls form a passage between them.

4. A detector according to claim 3 wherein the wire mesh has openings approximately the area of cross section of the passage.

5. A detector according to claim 3 including a wall at the end of the passage forming a light trap beyond the interior port.

* * * * *